(12) United States Patent
Ishii et al.

(10) Patent No.: US 9,154,770 B2
(45) Date of Patent: Oct. 6, 2015

(54) THREE-DIMENSIONAL IMAGING DEVICE, IMAGE PROCESSING DEVICE, IMAGE PROCESSING METHOD, AND PROGRAM

(75) Inventors: Yasunori Ishii, Osaka (JP); Masao Hiramoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 366 days.

(21) Appl. No.: 13/810,776

(22) PCT Filed: May 9, 2012

(86) PCT No.: PCT/JP2012/003028
§ 371 (c)(1),
(2), (4) Date: Jan. 17, 2013

(87) PCT Pub. No.: WO2012/157210
PCT Pub. Date: Nov. 22, 2012

(65) Prior Publication Data
US 2013/0120540 A1 May 16, 2013

(30) Foreign Application Priority Data

May 19, 2011 (JP) ................................. 2011-112603

(51) Int. Cl.
*H04N 13/02* (2006.01)
*G03B 35/08* (2006.01)
(52) U.S. Cl.
CPC ....... *H04N 13/0225* (2013.01); *H04N 13/0214* (2013.01); *G03B 35/08* (2013.01)
(58) Field of Classification Search
CPC .................. H04N 13/0214; H04N 13/0225
See application file for complete search history.

(56) References Cited

U.S. PATENT DOCUMENTS

2002/0171740 A1   11/2002   Seo
2007/0102622 A1*   5/2007   Olsen et al. ............... 250/208.1
(Continued)

FOREIGN PATENT DOCUMENTS

JP         02-171737 A      7/1990
JP      2002-344999 A     11/2002
(Continued)

OTHER PUBLICATIONS

International Search Report for corresponding International Application No. PCT/JP2012/003028 mailed Jul. 24, 2012.

*Primary Examiner* — Jeffery Harold
*Assistant Examiner* — Sean Haiem
(74) *Attorney, Agent, or Firm* — Renner, Otto, Boisselle & Sklar, LLP

(57) ABSTRACT

A 3D image capture device includes: a light transmitting section 2 with m transmitting areas (where m is an integer and m≥2) that have different spectral transmittance characteristics; and an image sensor 1 which is arranged to receive light rays that have been transmitted through the m transmitting areas and in which unit elements are arranged. Each unit element includes n photosensitive cells (where n is an integer and n≥m) and n transmitting filters with mutually different spectral transmittance characteristics which are arranged so as to face the n photosensitive cells. The image capture device further includes an image processing section which modifies an n×m matrix that is defined by the respective spectral transmittance characteristics of the m transmitting areas and the n transmitting filters by changing the angle between at least two out of m column vectors of the n×m matrix and which generates multi-viewpoint images using the modified n×m matrix.

10 Claims, 12 Drawing Sheets

(56) References Cited

U.S. PATENT DOCUMENTS

| | | | |
|---|---|---|---|
| 2007/0146325 A1* | 6/2007 | Poston et al. | 345/163 |
| 2009/0127430 A1 | 5/2009 | Hirasawa et al. | |
| 2009/0284627 A1 | 11/2009 | Bando et al. | |
| 2010/0066854 A1 | 3/2010 | Mather et al. | |
| 2012/0133743 A1* | 5/2012 | Hiramoto et al. | 348/46 |

FOREIGN PATENT DOCUMENTS

| | | |
|---|---|---|
| JP | 2003-134533 A | 5/2003 |
| JP | 2009-225454 A | 10/2009 |
| JP | 2009-276294 A | 11/2009 |
| JP | 2010-038788 A | 2/2010 |
| JP | 2010-079298 A | 4/2010 |

\* cited by examiner $$\mathbf{A} = \begin{pmatrix} Mx11 \\ Mx21 \end{pmatrix}, \quad \mathbf{B} = \begin{pmatrix} Mx12 \\ Mx22 \end{pmatrix}$$

$$\det = |\mathbf{A}||\mathbf{B}|\sin\theta$$

(a) INPUT IMAGE (b) PARALLAX IMAGES GENERATED (a) CORRELATION BETWEEN MULTI-VIEWPOINT IMAGES (b) DEGREE OF CONFIDENCE OF MULTI-VIEWPOINT IMAGES

THREE-DIMENSIONAL IMAGING DEVICE, IMAGE PROCESSING DEVICE, IMAGE PROCESSING METHOD, AND PROGRAM

TECHNICAL FIELD

The present application relates to a single-lens 3D image capturing technology for generating multiple images with parallax.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as a "multi-viewpoint image") by using a single camera have been researched and developed. Such a method is called a "single-lens image capturing method". For example, Patent Document No. 1 discloses a technique for obtaining two images with parallax at the same time using color filters. FIG. 16 schematically illustrates an image capturing system that adopts such a technique. The image capturing system that uses that technique includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film 21. In the meantime, only red- and blue-based light rays are respectively transmitted through the two color filters 20a and 20b of the light beam confining plate 20. As a result, a magenta-based color image is produced on the photosensitive film 21 by the light rays that have been transmitted through the two color filters. In this case, since the color filters 20a and 20b are arranged at mutually different positions, the image produced on the photosensitive film 21 comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 1, multi-viewpoint images can be produced using the two color filters.

According to the technique disclosed in Patent Document No. 1, the light rays are imaged on the photosensitive film, thereby producing multiple images with parallax there. Meanwhile, Patent Document No. 2 discloses a technique for producing images with parallax by transforming incoming light into electrical signals. FIG. 17 schematically illustrates a light beam confining plate 22 according to such a technique. Specifically according to that technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 3 also discloses a technique for obtaining images with parallax using a similar configuration to the one illustrated in FIG. 17. FIG. 18 schematically illustrates a light beam confining plate 23 as disclosed in Patent Document No. 3. According to that technique, by making the incoming light pass through R, G and B areas 23R, 23G and 23B of the light beam confining plate 23, multiple images with parallax can also be produced.

Patent Document No. 4 also discloses a technique for generating multiple images with parallax using a pair of filters with mutually different colors, which are arranged symmetrically to each other with respect to an optical axis. By using red and blue filters as the pair of filters, an R pixel that senses a red ray observes the light that has been transmitted through the red filter, while a B pixel that senses a blue ray observes the light that has been transmitted through the blue filter. Since the red and blue filters are arranged at two different positions, the light received by the R pixel and the light received by the B pixel have come from mutually different directions. Consequently, the image observed by the R pixel and the image observed by the B pixel are ones viewed from two different viewpoints. By defining corresponding points between those images on a pixel-by-pixel basis, the magnitude of parallax can be calculated. And based on the magnitude of parallax calculated and information about the focal length of the camera, the distance from the camera to the subject can be obtained.

Patent Document No. 5 discloses a technique for obtaining information about a subject distance based on two images that have been generated using either a diaphragm to which two color filters with mutually different aperture sizes (e.g., red and blue color filters) are attached or a diaphragm to which two color filters in two different colors are attached horizontally symmetrically with respect to the optical axis. According to such a technique, if light rays that have been transmitted through the red and blue color filters with mutually different aperture sizes are observed, the degrees of blur observed vary from one color to another. That is why the degrees of blur of the two images that are associated with the red and blue color filters vary according to the subject distance. By defining corresponding points with respect to those images and comparing their degrees of blur to each other, information about the distance from the camera to the subject can be obtained.

On the other hand, if light rays that have been transmitted through two color filters in two different colors that are attached horizontally symmetrically with respect to the optical axis are observed, the direction from which the light observed has come changes from one color to another. As a result, two images that are associated with the red and blue color filters become images with parallax. And by defining corresponding points with respect to those images and calculating the distance between those corresponding points, information about the distance from the camera to the subject can be obtained.

According to the techniques disclosed in Patent Documents Nos. 1 to 5 mentioned above, images with parallax can be produced by arranging RGB color filters on a light beam confining plate or a diaphragm. However, since the RGB based color filters are used, the percentage of the incoming light that can be used decreases significantly. In addition, to increase the effect of parallax, those color filters should be arranged at distant positions and should have decreased areas. In that case, however, the percentage of the incoming light that can be used further decreases.

Unlike these techniques, Patent Document No. 6 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, multi-viewpoint images can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 2-171737
Patent Document No. 2: Japanese Laid-Open Patent Publication No. 2002-344999
Patent Document No. 3: Japanese Laid-Open Patent Publication No. 2009-276294
Patent Document No. 4: Japanese Laid-Open Patent Publication No. 2010-38788
Patent Document No. 5: Japanese Laid-Open Patent Publication No. 2010-79298
Patent Document No. 6: Japanese Laid-Open Patent Publication No. 2003-134533

SUMMARY OF INVENTION

Technical Problem

According to any of the techniques disclosed in Patent Documents Nos. 1 to 5, multi-viewpoint images can be certainly obtained, but the quantity of the light received by the image sensor is much smaller than usual because primary color (RGB) based color filters are used. On the other hand, according to the technique disclosed in Patent Document No. 6, a normal image that uses the incoming light highly efficiently can be obtained by using a mechanism that removes a color filter from the optical path by mechanical driving. Even with that technique, however, primary color based color filters are also used to obtain multi-viewpoint images. Consequently, the multi-viewpoint images cannot be obtained with the incoming light used sufficiently efficiently. On top of that, according to such a technique, the overall size of the device increases too much and the manufacturing cost becomes too high.

An embodiment of the present invention provides an image capturing technique for obtaining multi-viewpoint images with the incoming light used highly efficiently without making any mechanical driving.

Solution to Problem

To overcome these problems, a 3D image capture device as an embodiment of the present invention includes: a light transmitting section with m transmitting areas (where m is an integer that is equal to or greater than two) that have mutually different spectral transmittance characteristics; and an image sensor which is arranged to receive light rays that have been transmitted through the m transmitting areas and in which a plurality of unit elements are arranged. Each unit element includes n photosensitive cells (where n is an integer that is equal to or greater than m) and n transmitting filters with mutually different spectral transmittance characteristics which are arranged so as to face the n photosensitive cells. The image capture device further includes: an imaging section which produces an image on the imaging area of the image sensor; and an image processing section which modifies an n×m matrix that is defined by the respective spectral transmittance characteristics of the m transmitting areas and the n transmitting filters by changing the angle between at least two out of m column vectors of the n×m matrix and which generates multi-viewpoint images represented by light rays that have been incident on at least two of the m transmitting areas based on the modified n×m matrix and n photoelectrically converted signals supplied from the n photosensitive cells.

These general and particular embodiments can be implemented as a system, a method, a computer program or a combination thereof.

Advantageous Effects of Invention

According to an embodiment of the present invention, multi-viewpoint images can be obtained without making any mechanical driving and with the light used more efficiently than ever.

Figure 1:
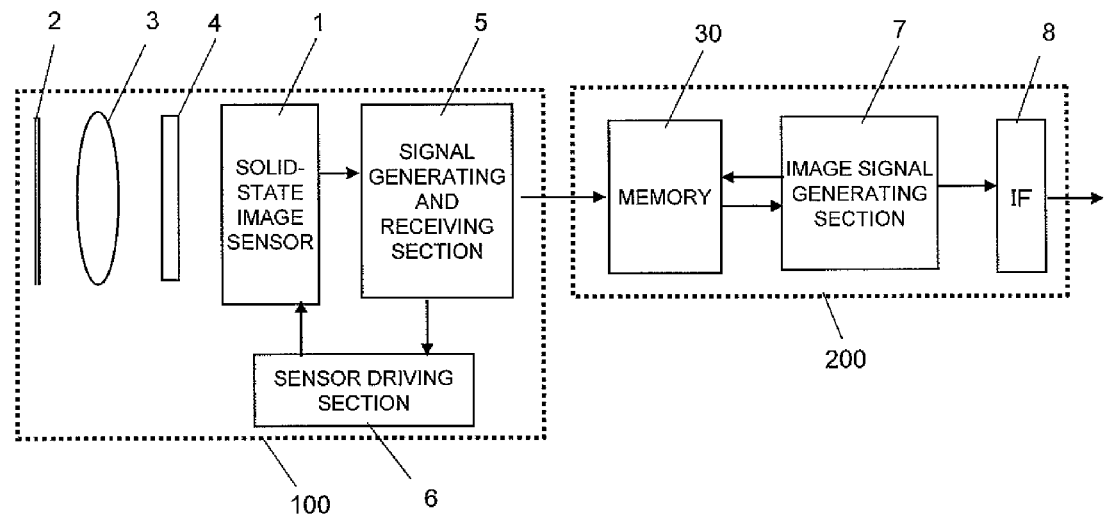
FIG. 1 A block diagram illustrating an overall configuration for a first embodiment.

DESCRIPTION OF EMBODIMENTS (1) A 3D image capture device as an embodiment of the present invention includes: a light transmitting section with m transmitting areas (where m is an integer that is equal to or greater than two) that have mutually different spectral transmittance characteristics; and an image sensor which is arranged to receive light rays that have been transmitted through the m transmitting areas and in which a plurality of unit elements are arranged. Each unit element includes n photosensitive cells (where n is an integer that is equal to or greater than m) and n transmitting filters with mutually different spectral transmittance characteristics which are arranged so as to face the n photosensitive cells. The image capture device further includes: an imaging section which produces an image on the imaging area of the image sensor; and an image processing section which modifies an n×m matrix that is defined by the respective spectral transmittance characteristics of the m transmitting areas and the n transmitting filters by changing the angle between at least two out of m column vectors of the n×m matrix and which generates multi-viewpoint images represented by light rays that have been incident on at least two of the m transmitting areas based on the modified n×m matrix and n photoelectrically converted signals supplied from the photosensitive cells.

(2) In one embodiment, the image processing section increases the determinant of the n×m matrix by increasing the angle between at least two of the m column vectors.

(3) In one embodiment of the 3D image capture device of (1) or (2), the image processing section changes the angle so that a value representing correlation between the multi-viewpoint images becomes smaller than a predetermined threshold value.

(4) In one embodiment of the 3D image capture device of one of (1) to (3), the image processing section increases the angle so that the determinant of the n×m matrix becomes greater than a predetermined threshold value.

(5) In one embodiment of the 3D image capture device of one of (1) to (4), the image processing section increases the angle between two column vectors that is smaller than the angle formed by any other pair of the m column vectors.

(6) In one embodiment of the 3D image capture device of one of (1) to (5), the image processing section obtains the angle between two arbitrary ones of the m column vectors and increases the angles sequentially by beginning with the smallest one, thereby increasing the determinant of the n×m matrix.

(7) In one embodiment of the 3D image capture device of one of (1) to (6), m=2 and n=2.

(8) An image processor as an embodiment of the present invention generates multi-viewpoint images based on a signal that has been obtained by a 3D image capture device. The 3D image capture device includes: a light transmitting section with m transmitting areas (where m is an integer that is equal to or greater than two) that have mutually different spectral transmittance characteristics; and an image sensor which is arranged to receive light rays that have been transmitted through the m transmitting areas and in which a plurality of unit elements are arranged. Each unit element includes n photosensitive cells (where n is an integer that is equal to or greater than m) and n transmitting filters with mutually different spectral transmittance characteristics which are arranged so as to face the n photosensitive cells. The image capture device further includes an imaging section which produces an image on the imaging area of the image sensor. The image processor modifies an n×m matrix that is defined by the respective spectral transmittance characteristics of the m transmitting areas and the n transmitting filters by changing the angle between at least two out of m column vectors of the n×m matrix and generates multi-viewpoint images represented by light rays that have been incident on at least two of the m transmitting areas based on the modified n×m matrix and n photoelectrically converted signals supplied from the n photosensitive cells.

(9) An image processing method as an embodiment of the present invention is designed to generate multi-viewpoint images based on a signal that has been obtained by a 3D image capture device. The device includes: a light transmitting section with m transmitting areas (where m is an integer that is equal to or greater than two) that have mutually different spectral transmittance characteristics; and an image sensor which is arranged to receive light rays that have been transmitted through the m transmitting areas and in which a plurality of unit elements are arranged. Each unit element includes n photosensitive cells (where n is an integer that is equal to or greater than m) and n transmitting filters with mutually different spectral transmittance characteristics which are arranged so as to face the n photosensitive cells. The image capture device further includes an imaging section which produces an image on the imaging area of the image sensor. The image processing method comprises the steps of: modifying an n×m matrix that is defined by the respective spectral transmittance characteristics of the m transmitting areas and the n transmitting filters by changing the angle between at least two out of m column vectors of the n×m matrix; and generating multi-viewpoint images represented by light rays that have been incident on at least two of the m transmitting areas based on the modified n×m matrix and n photoelectrically converted signals supplied from the photosensitive cells.

(10) An image processing program as an embodiment of the present invention is designed to generate multi-viewpoint images based on a signal that has been obtained by a 3D image capture device. The 3D image capture device includes: a light transmitting section with m transmitting areas (where m is an integer that is equal to or greater than two) that have mutually different spectral transmittance characteristics; and an image sensor which is arranged to receive light rays that have been transmitted through the m transmitting areas and in which a plurality of unit elements are arranged. Each unit element includes n photosensitive cells (where n is an integer that is equal to or greater than m) and n transmitting filters with mutually different spectral transmittance characteristics which are arranged so as to face the n photosensitive cells. The 3D image capture device further includes an imaging section which produces an image on the imaging area of the image sensor. The image processing program is defined so as to make a computer perform the steps of: modifying an n×m matrix that is defined by the respective spectral transmittance characteristics of the m transmitting areas and the n transmitting filters by changing the angle between at least two out of m column vectors of the n×m matrix; and generating multi-viewpoint images represented by light rays that have been incident on at least two of the m transmitting areas based on the modified n×m matrix and n photoelectrically converted signals supplied from the n photosensitive cells.

Hereinafter, specific embodiments of the present invention will be described with reference to the accompanying drawings. In the following description, any element shown in multiple drawings and having substantially the same function will be identified by the same reference numeral. It should be noted that a signal or information representing an image will be sometimes referred to herein as just an "image".

Embodiment 1

FIG. 1 is a block diagram illustrating an overall configuration for an image capture device as a first embodiment of the present invention. The image capture device of this embodiment is a digital electronic camera and includes an image capturing section 100 and a signal processing section 200 that receives a signal from the image capturing section 100 and outputs a signal representing an image (i.e., an image signal).

The image capturing section 100 includes a solid-state image sensor 1 (which will be simply referred to herein as an "image sensor") with a number of photosensitive cells (pixels) that are arranged on its imaging area, a light-transmitting plate (light-transmitting section) 2, which has two transmitting areas, of which the transmittances have mutually different wavelength dependences (i.e., different spectral transmittances), an optical lens 3 for producing an image on the imaging area of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 1 is typically a CCD or CMOS sensor, which may be fabricated by known semiconductor device processing technologies. The signal generating and receiving section 5 and the sensor driving section 30 may be implemented as an LSI such as a CCD driver.

The signal processing section 200 includes an image signal generating section 7 for generating an image signal by processing the signal supplied from the image capturing section 100, a memory 30 for storing various kinds of data for use to generate the image signal, and an interface (I/F) section 8 for sending out the image signal thus generated to an external device. The image signal generating section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image signal generating section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, description thereof will be omitted herein because none of them are essential components that would make it difficult to understand how the present invention works unless they were described in detail.

Next, the configuration of the image capturing section 100 will be described in further detail with reference to FIGS. 2 through 4.

Figure 2:
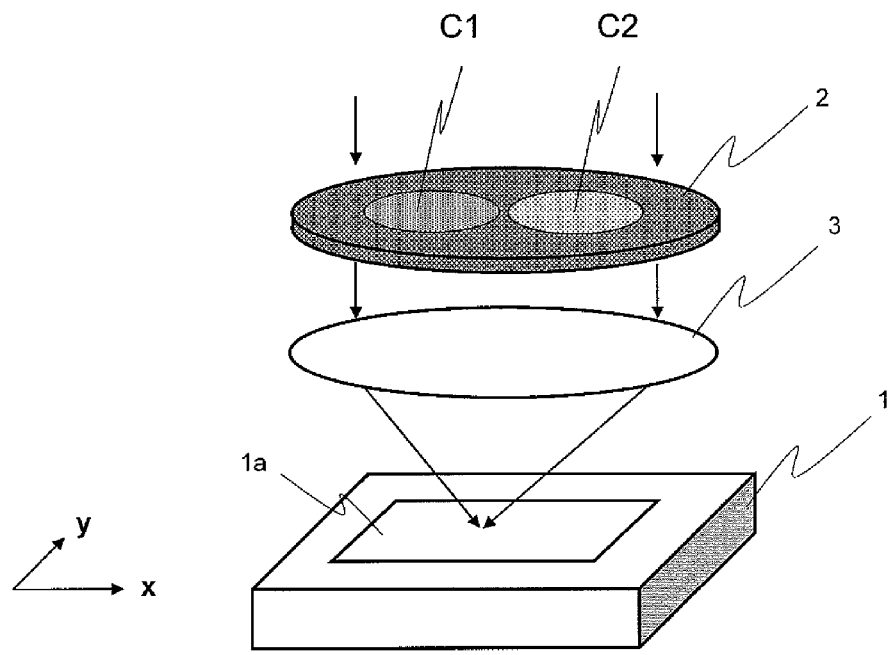
FIG. 2 A schematic representation generally illustrating the relative arrangement of a light-transmitting plate, an optical system and an image sensor according to the first embodiment.

FIG. 2 schematically illustrates the relative arrangement of the light-transmitting plate 2, the optical lens 3 and the image sensor 1 in the image capturing section 100. It should be noted that illustration of the other elements is omitted in FIG. 2. The light-transmitting plate 2 has two transmitting areas C1 and C2 that have mutually different spectral transmittances and transmits the incoming light. The optical lens 3 is a known lens and condenses the light that has been transmitted through the light-transmitting plate 2, thereby imaging the light on the imaging area 1a of the image sensor 1. The rest of the light-transmitting plate 2 other than the transmitting areas C1 and C2 is made of an opaque member, and this light-transmitting plate 2 is configured to prevent the incoming light from being transmitted through the area other than the transmitting areas C1 and C2. In the coordinate system used in the following description, the direction that points from the area C1 toward the area C2 will be referred to herein as "x direction" and the direction that is defined perpendicularly to the x direction on a plane parallel to the imaging area 1a will be referred to herein as "y direction". It should be noted that the arrangement of the respective members shown in FIG. 2 is only an example of the present invention. And the present invention is in no way limited to that specific embodiment. Alternatively, as long as an image can be produced on the imaging area 1a, the lens 3 may be arranged more distant from the image sensor 1 than the light-transmitting plate 2 is. Still alternatively, the lens 3 and the light-transmitting plate 2 may also be implemented as a single optical element.

Figure 3:
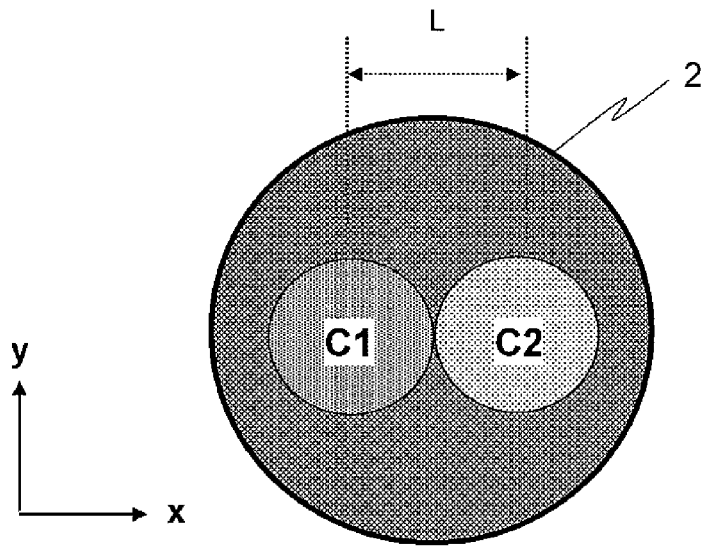
FIG. 3 A view illustrating an arrangement of transmitting areas on a light-transmitting plate according to the first embodiment.

FIG. 3 is a front view of the light-transmitting plate 2 of this embodiment. The light-transmitting plate 2, as well as the lens 3, has a circular shape in this embodiment but may also have any other shape. In each of the areas C1 and C2, arranged is a transmitting filter that transmits at least partially a light ray falling within an arbitrary wavelength range included in the wavelength range of visible radiation W. Each of those transmitting filters transmits a light ray falling within an arbitrary wavelength range included in the wavelength range of the visible radiation. However, since their spectral transmittances are different, the light transmitted will have different brightness (or luminance) values depending on whether the light has been transmitted through the area C1 or the area C2. The spectral transmittances of the respective transmitting areas will be described in detail later. As long as each transmitting filter has the function of transmitting the light at an intended transmittance, the filter may be made of any material. For example, the transmitting filters may be made of glass, plastic, cellophane or any other suitable material. Although transmitting filters with mutually different spectral transmittances are arranged in this embodiment in the transmitting areas C1 and C2, those areas may be made of any other member as long as the member has the intended spectral transmittance. For instance, if one of the two transmitting areas needs to be transparent, then that area may be replaced with the air.

The areas C1 and C2 are arranged with a certain gap L left in the x direction. The gap L is determined by the size of the lens 3 so that the image obtained will have appropriate parallax, and may be set to be within the range of a few millimeters to several centimeters, for example. As shown in FIG. 3, the transmitting areas C1 and C2 are suitably arranged horizontally symmetrically (i.e., in the x direction) with respect to the optical axis and have the same area. If such an arrangement is adopted, the quantities of the light rays to be incident on the left and right areas C1 and C2 become substantially equal to each other. It should be noted that the arrangement of the transmitting areas C1 and C2 does not have to be the one shown in FIG. 3 but may also be determined appropriately according to the intended use. For example, if information about vertical parallax (i.e., in the y direction) needs to be obtained, then the transmitting areas C1 and C2 may be arranged in the y direction. Also, if the respective transmittances of the transmitting areas C1 and C2 are significantly different from each other, then the pixel values to be observed will also be quite different. As a result, two images to be obtained will have different brightness values. That is why if there is a significant difference in transmittance between those transmitting areas C1 and C2, the planar areas of those areas C1 and C2 may be adjusted so that two images to be obtained will have close brightness values.

On the imaging area 1a of the image sensor 1 shown in FIG. 2, there is an array of photosensitive cells that are arranged two-dimensionally and an array of transmitting filters that are arranged to face those photosensitive cells in the array. The array of photosensitive cells and the array of transmitting filters consist of multiple unit elements. In this embodiment, each unit element includes two photosensitive cells and two associated transmitting filters that face them. Each of those photosensitive cells is typically a photodiode, which performs photoelectric conversion and outputs an electrical signal representing the quantity of the light received (which will be referred to herein as a "photoelectrically converted signal" or a "pixel signal"). On the other hand, each transmitting filter may be made of a known pigment or a stack of dielectric materials and is designed so as to transmit at least a part of a light ray with an arbitrary wavelength falling within the visible radiation wavelength range.

Figure 4:
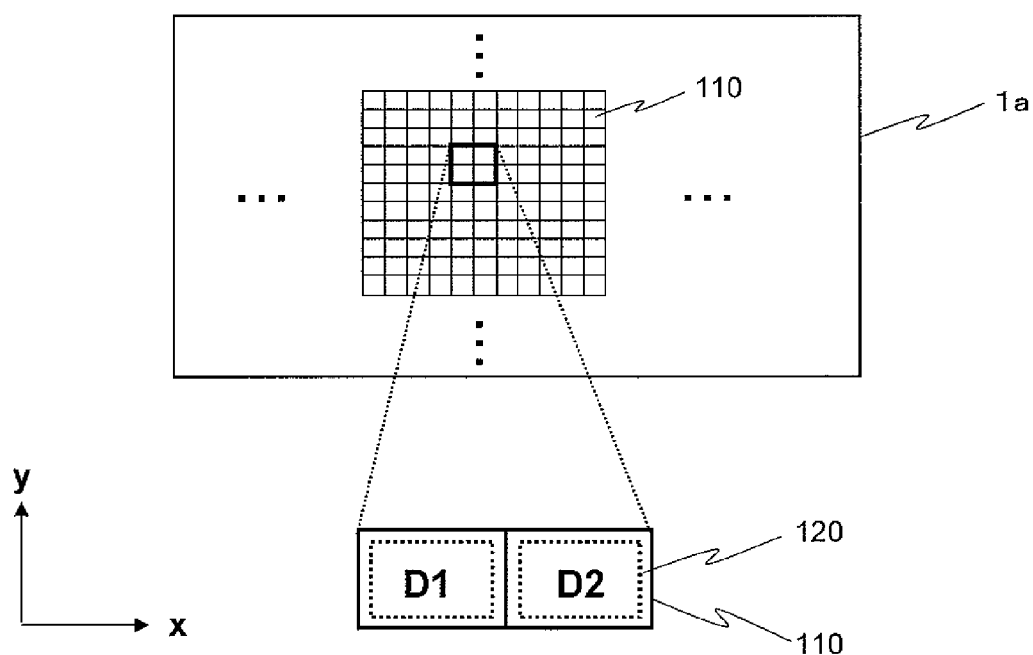
FIG. 4 A view illustrating a basic arrangement of transmitting filters in the image sensor of the first embodiment.

FIG. 4 is a top view schematically illustrating a portion of the array of transmitting filters according to this embodiment. As shown in FIG. 4, a lot of transmitting filters 110 are arranged in columns and rows on the imaging area 1a. As described above, each unit element includes two transmitting filters 110 that are arranged close to each other and two photosensitive cells 120 that face them. The two transmitting filters D1 and D2 that are included in each unit element both transmit a light ray with an arbitrary wavelength falling within the visible radiation wavelength range but their transmittances have mutually different wavelength dependences.

In the example illustrated in FIG. 4, two photosensitive cells are arranged horizontally (i.e., in the x direction). However, the photosensitive cells 120 may also be arranged in any other pattern. For example, the photosensitive cells may be arranged vertically (i.e., in the y direction) or obliquely. Furthermore, the number of photosensitive cells 120 included in a single unit element does not have to be two but may also be three or more. Moreover, the photosensitive cells 120 and the transmitting filters 110 do not have to be arranged in the x and y directions but may also be arranged obliquely with respect to the x and y directions.

Figure 5:
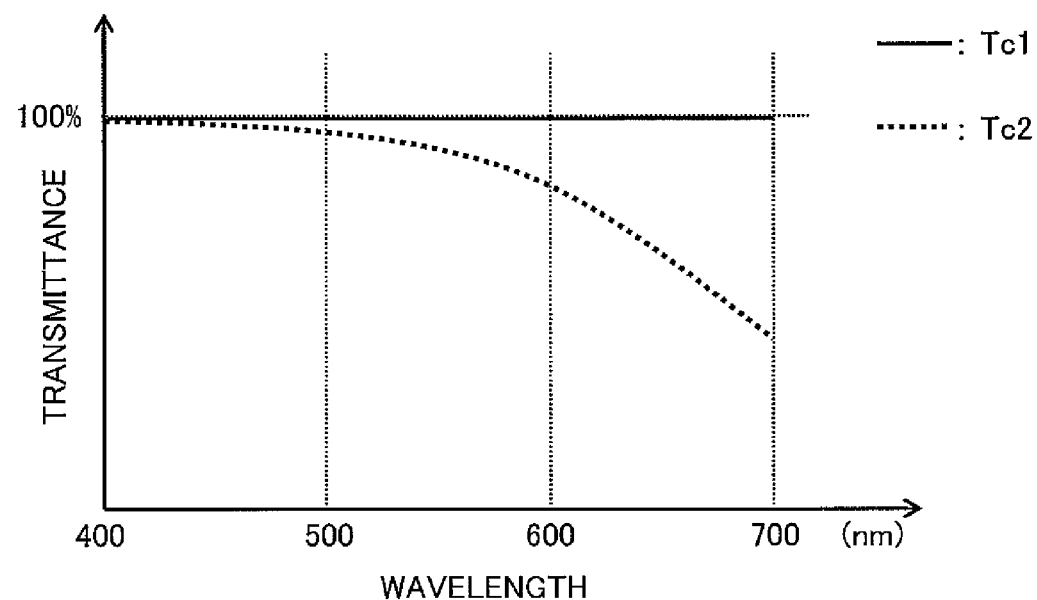
FIG. 5 A graph showing exemplary spectral transmittances of the transmitting filters of the light-transmitting plate.
Figure 6:
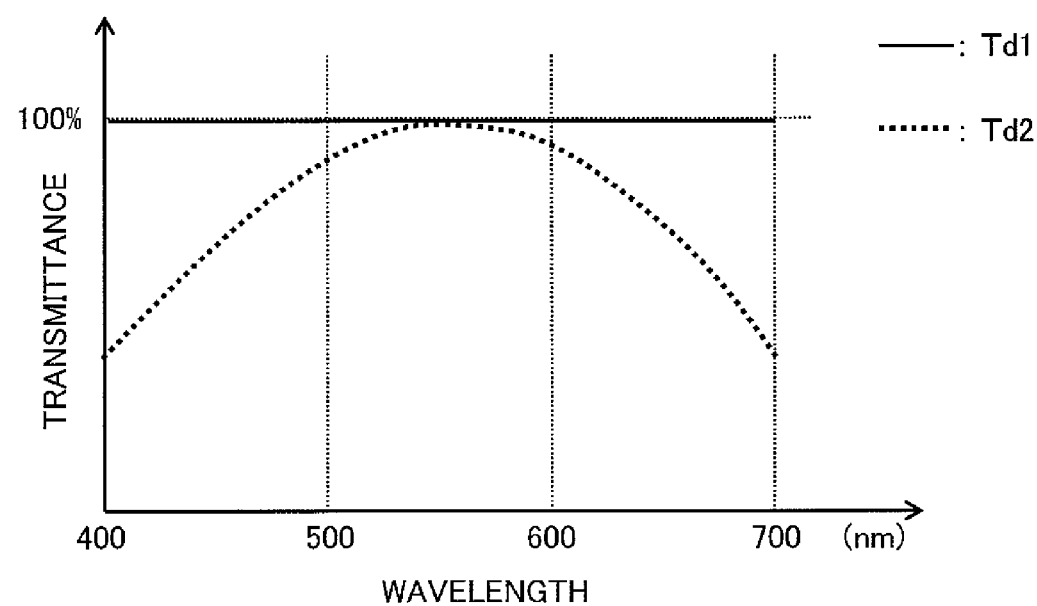
FIG. 6 A graph showing exemplary spectral transmittances of the transmitting filters of the image sensor.

Next, exemplary spectral transmittances of the transmitting areas C1 and C2 and the transmitting filters D1 and D2 according to this embodiment will be described briefly. FIG. 5 shows exemplary spectral transmittances of the transmitting areas C1 and C2 of the light-transmitting plate 2, and FIG. 6 shows exemplary spectral transmittances of the transmitting filters D1 and D2 of the image sensor 1. In this example, the spectral transmittance Tc1 of the area C1 is represented by a waveform similar to a rectangular wave, of which the spectral transmittance becomes almost 100% in the visible radiation wavelength range (i.e., from approximately 400 nm to approximately 700 nm). On the other hand, the spectral transmittance Tc2 of the area C2 is represented by a waveform similar to a cos curve in the visible radiation wavelength range. Meanwhile, the spectral transmittance Td1 of the transmitting filter D1 is represented by a waveform similar to a rectangular wave, while the spectral transmittance Td2 of the transmitting filter D2 is represented by a waveform similar to a sin curve. In this example, as for Tc1 and Td1, the transmittance is almost 100% at any wavelength, and therefore, light hardly attenuates and good sensitivity characteristic is realized.

Figure 7:
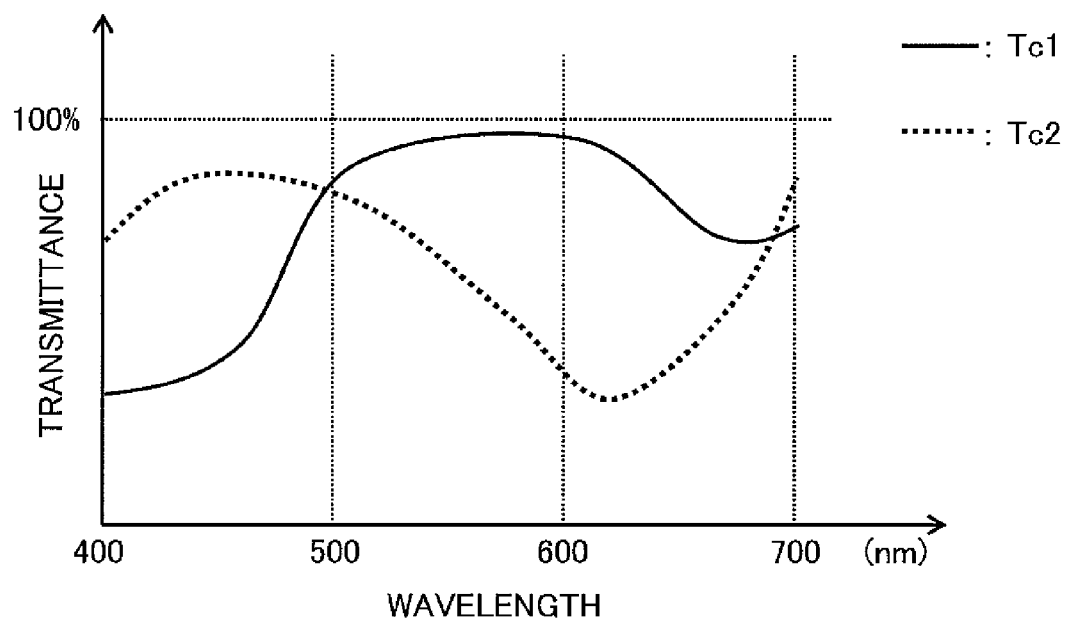
FIG. 7 A graph showing other exemplary spectral transmittances of the transmitting filters of the light-transmitting plate.
Figure 8:
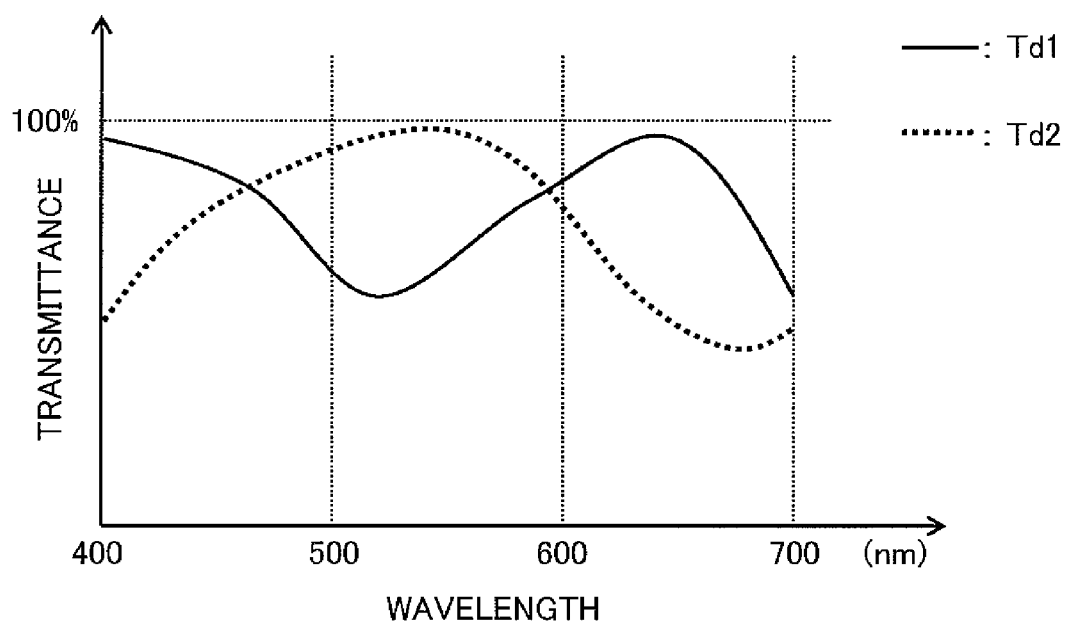
FIG. 8 A graph showing other exemplary spectral transmittances of the transmitting filters of the image sensor.

The filters do not have to be designed as shown in FIGS. 5 and 6 but may also be designed to make Tc1 and Tc2 different from each other and also make Td1 and Td2 different from each other. For example, the respective transmitting areas and transmitting filters may be designed so that Tc1, Tc2, Td1 and Td2 are represented by waveforms other than the rectangular wave and the trigonometric function as shown in FIGS. 7 and 8. Optionally, Tc1, Tc2, Td1 and Td2 may also be set so as to totally cut off light falling within a particular part of the visible radiation wavelength range. Nevertheless, in order to use the incoming light more efficiently, the smaller the wavelength range to be cut off, the better, and the higher the overall transmittance, the better.

According to such an arrangement, the light that has entered this image capture device during an exposure process passes through the light-transmitting plate 2, the lens 3, the infrared cut filter 4 and the transmitting filters 110 and then is incident on the photosensitive cells 120. Each of those photosensitive cells receives a light ray that has been transmitted through the area C1 or C2 of the light-transmitting plate 2 and then through its associated transmitting filter, and outputs a photoelectrically converted signal representing the quantity of the light received. The photoelectrically converted signal that has been output from each photosensitive cell is sent to the signal processing section 200 by way of the signal generating and receiving section 5. In the signal processing section 200, the image signal generating section 7 generates multi-viewpoint images based on the signals supplied from the image capturing section 100.

Hereinafter, the photoelectrically converted signals supplied from those photosensitive cells will be described. Signals representing the respective intensities of light rays that have been transmitted through the areas C1 and C2 and then incident on two pixels of interest will be identified herein by Ci1 and Ci2, respectively, in a situation where the transmitting areas C1 and C2 and the transmitting filters D1 and D2 are supposed to have a transmittance of 100% with respect to any wavelength. Also, a light ray with the same intensity is supposed to be incident on each of the photosensitive cells included in a single unit element and every incoming light is supposed to be visible radiation. Furthermore, for the sake of simplicity, the wavelength dependences of the intensities of the light rays that are incident on the areas C1 and C2 are neglected. That is to say, the subject is supposed to be in an achromatic color. Also, the spectral transmittance of the lens 3 and the infrared cut filter 4 combined will be identified herein by Tw. And the spectral transmittances of the areas C1 and C2 will be identified herein by Tc1 and Tc2, respectively.

In the same way, the spectral transmittances of the transmitting filters D1 and D2 at the image sensor 1 will be identified herein by Td1 and Td2, respectively.

In this case, Tw, Tc1, Tc2, Td1 and Td2 are functions that depend on the wavelength λ of the incoming light, and will be represented as Tw(λ), Tc1(λ), Tc2(λ), Td1(λ) and Td2(λ), respectively. And the signals representing the intensities of light rays that have been transmitted through the transmitting filters D1 and D2 and then received by photosensitive cells that face them are identified by d1 and d2, respectively. Furthermore, the integration operation of the spectral transmittances in the visible radiation wavelength range will be identified herein by the sign Σ. For example, an integration operation ∫Tw(λ)Tc1(λ)Td1(λ)dλ with respect to the wavelength λ will be identified herein by Σ TwTc1Td1. In this case, the integration is supposed to be performed in the entire visible radiation wavelength range. Then, d1 is proportional to the sum of Ci1 Σ TwTc1Td1 and Ci2 Σ TwTc2Td2. Likewise, d2 is proportional to the sum of Ci1 Σ TwTc1Td2 and Ci2 Σ TwTc2Td2. Supposing the constant of proportionality with respect to these relations is one, d1 and d2 can be represented by the following Equations (1) and (2), respectively:

$$d1 = Ci1\Sigma TwTc1Td1 + Ci2\Sigma TwTc2Td1 \quad (1)$$

$$d2 = Ci1\Sigma TwTc1Td2 + Ci2\Sigma TwTc2Td2 \quad (2)$$

Suppose, in Equations (1) and (2), Σ TwTc1Td1, Σ TwTc2Td1, Σ TwTc1Td2, and Σ TwTc2Td2 are identified by Mx11, Mx12, Mx21 and Mx22, respectively. Then, Equation (1) can be represented by the following Equation (3) using a matrix:

$$\begin{pmatrix} d1 \\ d2 \end{pmatrix} = \begin{pmatrix} Mx11 & Mx12 \\ Mx21 & Mx22 \end{pmatrix} \begin{pmatrix} Ci1 \\ Ci2 \end{pmatrix} \quad (3)$$

Supposing the respective elements of an inverse matrix, which is obtained by inverting the matrix consisting of the elements Mx11 through Mx22 as represented by Equation (3), are identified by iM11 through iM22, respectively, Equation (3) can be modified into the following Equation (4). That is to say, the signals Ci1 and Ci2 representing the intensities of the light rays that have been incident on the areas C1 and C2 can be represented by using the photoelectrically converted signals d1 and d2:

$$\begin{pmatrix} Ci1 \\ Ci2 \end{pmatrix} = \begin{pmatrix} iMx11 & iMx12 \\ iMx21 & iMx22 \end{pmatrix} \begin{pmatrix} d1 \\ d2 \end{pmatrix} \quad (4)$$

By performing calculations based on this Equation (4), the signals d1 and d2 (observed pixel values) representing the quantities of light rays that have been incident on respective pixels can be converted into the signals Ci1 and Ci2 representing the intensities of light rays to be incident on the transmitting areas C1 and C2. The image signal generating section 7 shown in FIG. 1 carries out a signal arithmetic operation based on this Equation (4), thereby generating signals Ci1 and Ci2 on a unit element basis. These signals Ci1 and Ci2 that have been generated on a unit element basis represent two images that have been produced by the light rays that were incident on the transmitting areas C1 and C2, respectively. That is to say, these two images form multi-viewpoint images that have parallax corresponding to the distance between the two transmitting areas C1 and C2. Consequently, by performing the arithmetic operations represented by Equation (4), multi-viewpoint images representing a difference in location between the transmitting areas C1 and C2 can be generated.

In an actual shooting environment, however, it is difficult to measure accurately the spectral transmittances of the respective transmitting filters due to an individual difference between the image sensors 1 or the light-transmitting plate's (2) transmitting filters or owing to a measuring error. And if the spectral transmittance characteristic cannot be measured appropriately, then the respective elements of the matrix represented by Equation (3) should have errors. If the errors of the respective elements are identified by Mx11', MX12', Mx21' and Mx22', respectively, then Equation (3) can be modified into the following Equation (5):

$$\begin{pmatrix} d1 \\ d2 \end{pmatrix} = \begin{pmatrix} Mx11 + Mx11' & Mx12 + Mx12' \\ Mx21 + Mx21' & Mx22 + Mx22' \end{pmatrix} \begin{pmatrix} Ci1 \\ Ci2 \end{pmatrix} \quad (5)$$

If the inverse matrix of the matrix represented by Equation (5) is obtained and modified into an equation for obtaining Ci1 and Ci2 like Equation (4), the following Equation (6) is obtained:

$$\begin{pmatrix} Ci1 \\ Ci2 \end{pmatrix} = \frac{1}{det} \begin{pmatrix} Mx22 + Mx22' & -Mx12 - Mx12' \\ -Mx21 - Mx21' & Mx11 + Mx11' \end{pmatrix} \begin{pmatrix} d1 \\ d2 \end{pmatrix} \quad (6)$$

In Equation (6), det stands for the determinant of the matrix of Equation (5) and det=(Mx11+Mx11')(Mx22+Mx22')−(Mx12+Mx12')(Mx21+Mx21'). By expanding Equation (6), Ci1 and Ci2 can be given by the following Equations (7) and (8), respectively:

$$Ci1 = \frac{1}{det}(d1Mx22 - d2Mx12) + \frac{1}{det}(d1Mx22' - d2Mx12') \quad (7)$$

$$Ci2 = \frac{1}{det}(d2Mx11 - d1Mx21) + \frac{1}{det}(d2Mx11' - d1Mx21') \quad (8)$$

In Equations (7) and (8), errors are involved in only the second term. Thus, these second terms will be referred to herein as "error terms". These error terms are inversely proportional to det. That is why even if the errors are significant but if det is large, the influence of the errors becomes a limited one. Conversely, even if the errors are insignificant but if det is small, the influence of the errors becomes far-reaching. In that case, Ci1 and Ci2 calculated will be quite different from the values obtained when there are no errors.

Also, in an actual shooting environment, since transmitting filters that attenuate the incoming light are arranged on the light-transmitting plate 2 and the image sensor 1, the quantity of the light received by each pixel decreases. That is why the image could also involve errors due to the influence of thermal noise, for example. In this case, if the errors that can be involved in the pixel signals d1 and d2 of an observed image are identified by d1' and d2', then Equation (3) can be modified into the following Equation (9):

$$\begin{pmatrix} d1 + d1' \\ d2 + d2' \end{pmatrix} = \begin{pmatrix} Mx11 & Mx12 \\ Mx21 & Mx22 \end{pmatrix} \begin{pmatrix} Ci1 \\ Ci2 \end{pmatrix} \quad (9)$$

If the inverse matrix of the matrix of Equation (9) is obtained and modified into an equation for obtaining Ci1 and Ci2 just like Equation (4), the following Equation (10) can be obtained:

$$\begin{pmatrix} Ci1 \\ Ci2 \end{pmatrix} = \frac{1}{det}\begin{pmatrix} Mx22 & -Mx12 \\ -Mx21 & Mx11 \end{pmatrix}\begin{pmatrix} d1+d1' \\ d2+d2' \end{pmatrix} \quad (10)$$

In Equation (10), det stands for the determinant of the matrix of Equation (9) and det=Mx11Mx22−Mx12Mx21. By expanding Equation (10), Ci1 and Ci2 can be given by the following Equations (11) and (12), respectively:

$$Ci1 = \frac{1}{det}(d1Mx22 - d2Mx12) + \frac{1}{det}(d1'Mx22 - d2'Mx12) \quad (11)$$

$$Ci2 = \frac{1}{det}(d2Mx11 - d1Mx21) + \frac{1}{det}(d2'Mx11 - d1'Mx21) \quad (12)$$

As in Equations (7) and (8), errors are also involved in the second term of Equations (11) and (12). And these error terms are inversely proportional to det. That is why even if the errors are significant but if det is large, the influence of the errors becomes a limited one. Conversely, even if the errors are insignificant but if det is small, the influence of the errors becomes far-reaching. In that case, Ci1 and Ci2 calculated will be quite different from the values obtained when there are no errors.

Thus, according to this embodiment, by paying attention to the fact that the error terms are inversely proportional to det, the matrix is corrected so as to increase det, thereby reducing the influence of the errors. As the determinant det may have a negative value, the matrix is corrected according to this embodiment so as to increase its absolute value |det|. In Equations (7), (8), (11) and (12), the first term is apparently inversely proportional to det. In the processing to be described later, however, the matrix is corrected so that when det is increased, the numerator of the first term of these equations also increases. Consequently, according to this embodiment, the influence of only the error terms can be reduced.

As a method for changing the value of a matrix, a matrix that reduces the influence of errors by making the respective elements vary freely may be obtained. If such a method is adopted, the best matrix needs to be selected from among a huge number of matrices that have been generated by changing the values of the respective elements little by little, thus imposing a lot of computational load, which is a problem.

Thus, to overcome such a problem, the first and second columns of the matrix of Equation (3) may be represented by vectors A and B, respectively. That is to say, vectors A and B are defined by the following Equation (13):

$$A = \begin{pmatrix} Mx11 \\ Mx21 \end{pmatrix}, \quad (13)$$

$$B = \begin{pmatrix} Mx12 \\ Mx22 \end{pmatrix}$$

Figure 9:
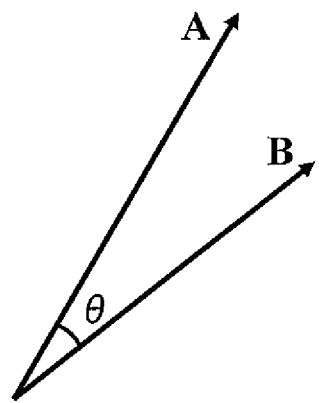
FIG. 9 Schematically illustrates an example of two vectors.

FIG. 9 schematically illustrates an example of the vectors A and B. These vectors A and B may be considered as vectors in the two-dimensional Euclidean space, and the determinant det may be obtained by calculating the exterior product of the vectors A and B. That is to say, the determinant det may be obtained by det=|A||B|sin θ, where θ is the angle formed between the vectors A and B. The larger this angle θ, the larger |det|. Conversely, the smaller this angle θ, the smaller |det|.

In view of these considerations, by changing the angle θ from 0 through 90 degrees by rotation and by obtaining |det| with respect to each of those angles, the best θ can be determined. It should be noted that if θ is changed from 0 through 90 degrees, |sin θ| can be changed from its minimum value of 0 through its maximum value of 1. That is why there is no need to change θ through 360 degrees by rotation.

In this case, |det| becomes maximum when θ=90 degrees (i.e., sin θ=1). Then, the vectors A and B will cross each other at right angles and the influence of the error term will be minimum. If the vector B is obtained by rotating the vector A 90 degrees, then the vector B is given by the following Equation (14):

$$B = \begin{pmatrix} \cos 90° & -\sin 90° \\ \sin 90° & \cos 90° \end{pmatrix}\begin{pmatrix} Mx11 \\ Mx21 \end{pmatrix} = \begin{pmatrix} -Mx21 \\ Mx11 \end{pmatrix} \quad (14)$$

In this example, |A|=|B| is supposed to be met for the sake of simplicity. In that case, the vector A becomes $(Mx11, Mx21)^T$ and the vector B becomes $(-Mx21, Mx11)^T$. Thus, the matrix consisting of these vectors A and B is represented by the following Equation (15):

$$M = \begin{pmatrix} Mx11 & -Mx21 \\ Mx21 & Mx11 \end{pmatrix} \quad (15)$$

By using this matrix M instead of the matrix represented by Equation (3), multi-viewpoint images which are hardly affected by the error term can be obtained. Specifically, if M represented by Equation (15) is used, Equations (11) and (12) become Ci1=1/det(d1Mx11+d2Mx21)+1/det(d1'Mx11+d2'Mx21) and Ci2=1/det(d2Mx11−d1Mx21)+1/det(d2'Mx11−d1'Mx21), respectively. In such an image, as the absolute value of Mx21 increases, Ci1 becomes brighter and Ci1 becomes darker (or come to include negative values). A simple method to avoid such a situation is to use a filter, of which the spectral transmittance includes Mx21 of zero.

Those equations are satisfied when a light-transmitting plate 2, in which red and blue color filters with almost the same transmittance are arranged in the transmitting areas C1 and C2, respectively, and an image sensor 1, in which red and blue color filters with similar transmittances are arranged as transmitting filters D1 and D2, respectively, are used. In that case, ΣTwTc1Td1=ΣTwTc2Td2 and ΣTwTc1Td2=ΣTwTc2Td1=0 are satisfied. In such a situation, however, Ci1=1/det(d1Mx11)+1/det(d1'Mx11) and Ci2=1/det(d2Mx11)+1/det(d2'Mx11) are satisfied and Ci1 and Ci2 are obtained by multiplying the input signals d1 and d2 by a constant. That is why even though the influence of the error term is limited, signals representing the light rays that have come from the areas C1 and C2 cannot be separated from the pixel signals. This is because in pixels corresponding to a portion of the subject, of which the depth does not vary, the pixel signals d1 and d2 have substantially the same values. For example, if d1=d2 is approximately satisfied, two equations corresponding to Equations (11) and (12) when the determinant M is used become the same. Consequently, the signals Ci1 and Ci2 cannot be obtained by making computations. In that case, the degree of correlation between the two multi-viewpoint images is so high that the image has almost no parallax, which is a problem.

Figure 10:
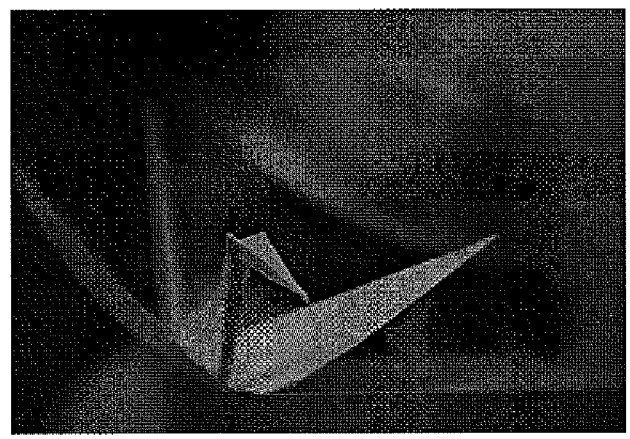
FIG. 10 Shows examples of an input image and multi-viewpoint images.
Figure 10:
Figure 10:
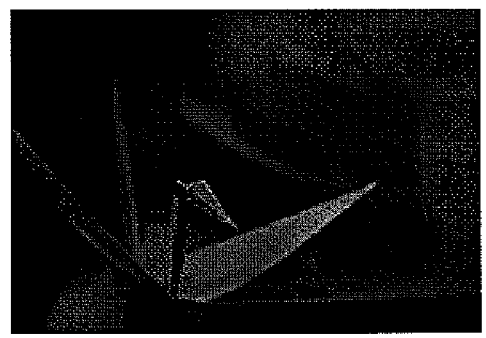

Next, it will be described by way of instances what influence the error term will have if |det| is small. FIG. 10 shows examples of an input image and multi-viewpoint images. Specifically, FIG. 10(*a*) shows an image (input image) that was obtained by capturing the object of shooting with a normal color image sensor. FIG. 10(*b*) shows multi-viewpoint images that were generated by Equation (4). In the matrix used in this example, the first column was $(1, 0.67)^T$, the second column was $(0.67, 0.5)^T$, and the value of the determinant det was 0.0511. The image shown on the left-hand side of FIG. 10(*b*) included negative values in a lot of pixels and was an image of which the pixel values were generally small. As can be seen, when such a matrix was used, multi-viewpoint images could not be obtained as intended. Since 1/det≈20 in this example, the error term (d1Mx22'−d2Mx12') in Equation (7) was amplified twenty-fold. In addition, since d1Mx22'<d2Mx12', the negative error increased twenty-fold and multi-viewpoint images could not be obtained as intended. As can be seen, the smaller |det|, the more steeply the error term is amplified. As a result, the image generated will have very large pixel values or negative pixel values.

Since these values are outside of the range in which the pixel values of an image are originally expected to fall, the output image will not be a proper image. That is why the likelihood as an image can be determined by examining the degree to which the pixel values of multi-viewpoint images generated fall within their originally expected range.

Figure 11:
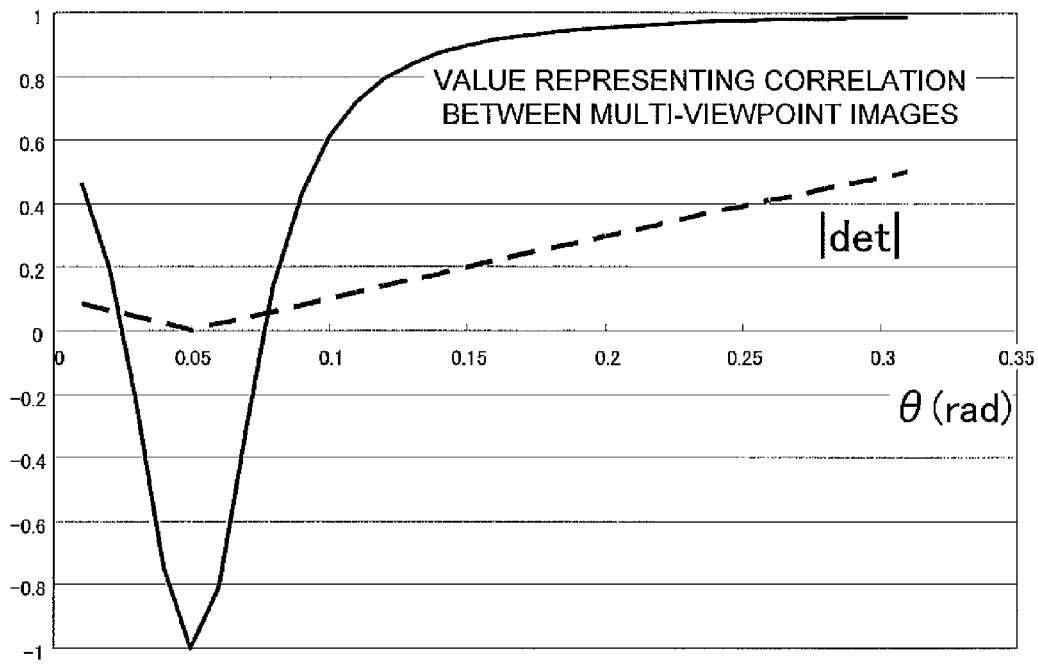
FIG. 11 A graph showing how the determinant value, the correlation value, and the degree of confidence change with θ.
Figure 11:
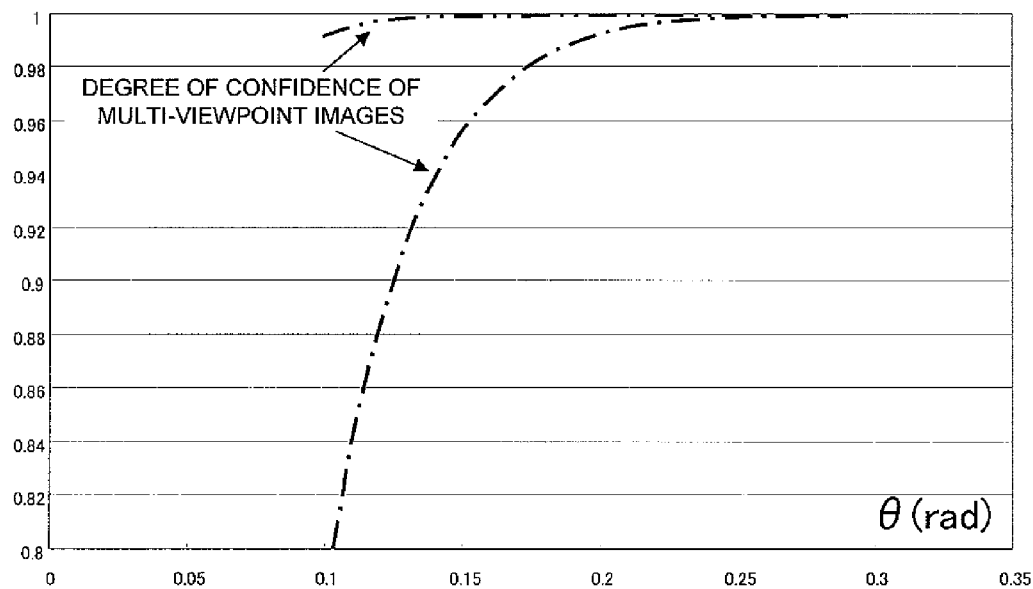

FIG. 11 is a graph showing how the |det| value, the value representing the correlation between the multi-viewpoint images, and the degree of confidence of the multi-viewpoint images change with θ. In this case, the "value representing the correlation between the multi-viewpoint images" is the average of the normalized correlation values that have been obtained on an RGB color component basis between the two multi-viewpoint images. Thus, the closer to one the correlation value is, the more closely the two images resemble each other. On the other hand, the "degree of confidence between the multi-viewpoint images" represents the percentage of pixels of each image that fall within the originally expected range (e.g., from 0 through 255) of pixel values.

As can be seen from FIG. 11(*a*), the larger θ, the larger |det|. It can also be seen that the larger θ, the greater the value of correlation between the multi-viewpoint images. And the greater the value of correlation between the multi-viewpoint images, the more closely the two images will resemble each other (i.e., the smaller the parallax will be). In this example, when the normalized correlation value exceeded 0.85, the difference between the two images tended to be hardly sensible.

On the other hand, in the example shown in FIG. 11(*b*), when θ=0.1 (rad), one of the two multi-viewpoint images had a degree of confidence of 98% or more but the other multi-viewpoint image had a degree of confidence of approximately 80%. It can be confirmed that as for each of these two images, the larger θ, the more significantly the degree of confidence increased and the influence of the error term decreased.

To sum up the results of these preliminary experiments, the larger θ, the greater the value correlation between the multi-viewpoint images (i.e., the smaller the parallax) but the higher the percentage of pixels, of which the pixel values fall within a predetermined range. Thus, it can be seen that it is beneficial to set θ to be a value that makes the value of correlation between the multi-viewpoint images fall within a range that is smaller than a predetermined value and that makes the degree of confidence of the multi-viewpoint images fall within a range that is larger than a predetermined value. Thus, according to this embodiment, the maximum θ is obtained in a range in which the degrees of confidence conf(S1, θ) and conf(S2, θ) of the two multi-viewpoint images are larger than a predetermined threshold value th and in a range in which the value of correlation cor(θ) between the multi-viewpoint images is smaller than a predetermined threshold value th' as represented by the following Equation (16):

$$\text{confidence}(S, \theta, x, y) = \begin{cases} 1 : \text{if } (0 \leq S(x, y, \theta) \text{ \& } \&S(x, y, \theta) \leq 255) \\ 0 : \text{otherwise} \end{cases} \quad (16)$$

$$conf(S, \theta) = \sum_{x,y} \text{confidence}(S, \theta, x, y)$$

$$\theta = \underset{\theta}{\operatorname{argmax}}$$

$$\{conf(S1, \theta) > th \text{ \& } \&conf(S2, \theta) > th \text{ \& } \& cor(\theta) < th'\}$$

In Equation (16), the pixel value at coordinates (x, y) on the multi-viewpoint images with respect to the angle θ is represented as S(x, y, θ). If the value of S(x, y, θ) falls within the range of 0 through 255, confidence (S, θ, x, y)=1. Otherwise, confidence (S, θ, x, y)=0. And the sum of confidence (S, θ, x, y) at every set of coordinates is defined to be the degree of confidence conf(S, θ). That is to say, conf(S, θ) represents the number of pixels, of which the pixel values fall within the range of 0 through 255, among all pixels. In a range in which the degree of confidence conf(S1, θ) of one of the multi-viewpoint images and the degree of confidence conf(S2, θ) of the other multi-viewpoint image are both larger than the threshold value th and in which the correlation value cor(θ) is smaller than the threshold value th', the maximum θ is determined. The threshold values th and th' may be set to be appropriate values according to the image obtained. In this case, the correlation value cor(θ) indicates a normalized correlation between two multi-viewpoint images as represented by the following Equation (17). However, as will be described later, any index other than the normalized correlation may also be used as a correlation value.

$$cor(\theta) = \frac{\sum_{x,y} S1(x, y, \theta)S2(x, y, \theta)}{\sum_{x,y} S1(x, y, \theta)^2 \sum_{x,y} S2(x, y, \theta)^2} \quad (17)$$

Figure 12:
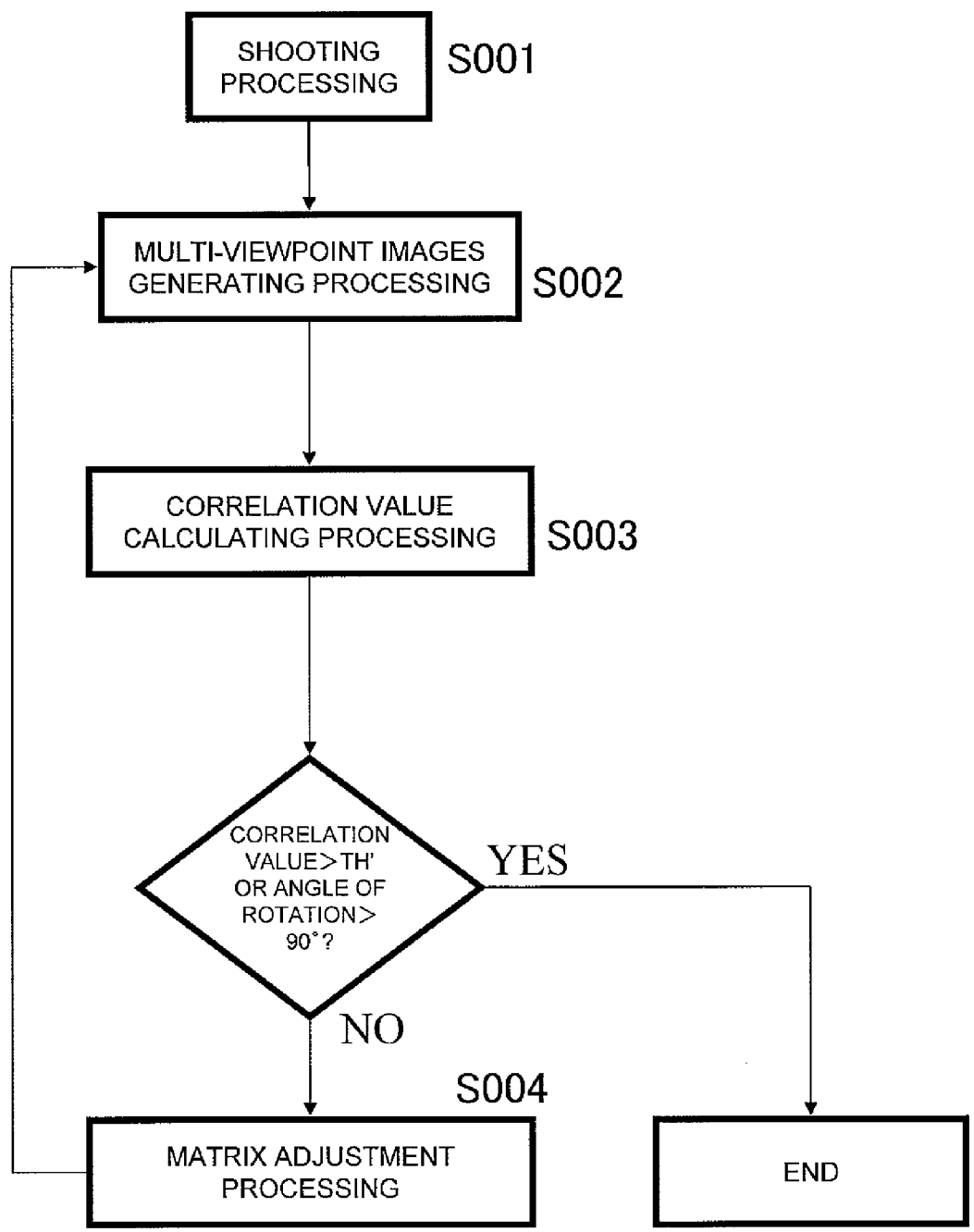
FIG. 12 A flowchart showing an exemplary flow of processing steps to be carried out according to the first embodiment.

FIG. 12 shows an exemplary flow of processing steps to be carried out to realize the processing described above. It should be noted that as the initial value of the determinant is determined when the spectral transmittance characteristic is measured, the initial value $\theta = \sin^{-1}(\det/|A||B|)$ of the parameter θ is also determined in advance. As described above, the first and second columns of the matrix are supposed to be vectors A and B, respectively, and det is supposed to be a non-zero determinant. First of all, in Step S001, shooting processing is carried out using the image capture device of this embodiment. Next, in the processing step S002 of generating multi-viewpoint images, multi-viewpoint images are generated by Equation (4). Subsequently, in the processing step S003 of calculating a correlation value, a value representing correlation between the multi-viewpoint images is calculated. As the correlation value, either the normalized correlation described above or any other index may be used. For example, any of ordinary distance calculating methods or degree of similarity calculating methods, which use the sum of absolute differences (L1 norm, city block distance) or the sum of squared differences (L2 norm, Euclidean distance) between pixels, for example, may be used. With a method for calculating the distance based on the difference between the images adopted, if its inverse number is used as the correlation value, the more closely the two multi-viewpoint images resemble each other, the greater the value of correlation can be.

In the flow shown in FIG. 12, when the correlation value exceeds the predetermined threshold value th' or when the angle of rotation of the vector exceeds 90 degrees, the processing is ended. Otherwise, in the processing step S004 of adjusting the matrix, θ is increased so that θ=θ+step, thereby changing the first column of the matrix. In this case, the angle defined between the vector A consisting of the elements of the first column of the matrix and the vector B consisting of the elements of the second column of the matrix just needs to be increased step by step, and the vector to rotate does not always have to be the vector A. Alternatively, the vector B may be rotated step by step. Still alternatively, both of the vectors A and B may be rotated by ±step/2 each time.

Figure 13:
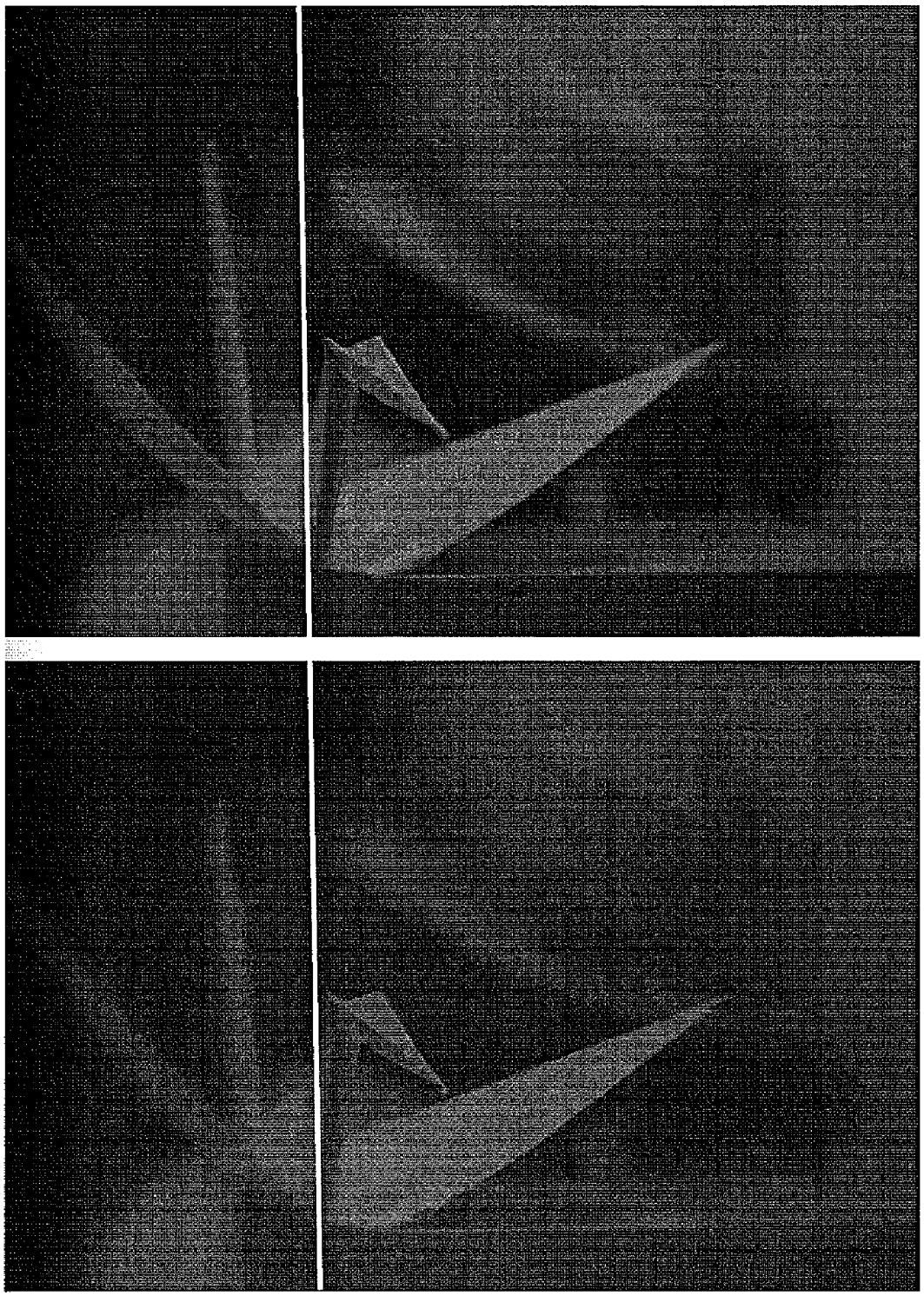
FIG. 13 Shows examples of multi-viewpoint images generated as a result of the processing of the first embodiment.

Examples of multi-viewpoint images generated as a result of the processing described above are shown in FIG. 13. Specifically, FIG. 13 shows multi-viewpoint images that were newly generated based on the input image shown in FIG. 10(a) by using a matrix that was corrected by increasing θ. In FIG. 13, the vertically running white line passes through the same x coordinate on the two images. As indicated by the white line, the paper crane's head is shifted to the right in the upper image compared to the lower image. These results proved the effectiveness of the method of this embodiment empirically, too.

By performing the processing described above, even if matrix elements or pixel signals involve errors, quality multi-viewpoint images with parallax can still be generated. Considering the errors of pixel signals, the image quality can also be improved even in a dark scene including a lot of noise. Also, in the transmitting areas C1 and C2 of the light-transmitting plate 2 and in the transmitting filters D1 and D2 of the image sensor 1, if a lot of light is transmitted, then the respective elements of the matrix will have mutually close values, |det| will decrease, and therefore, the image quality will be affected by the errors more easily. Even so, according to this embodiment, the influence of such errors can also be reduced so much that filters with high transmittance, with which images can be shot with high sensitivity, can be used, which is beneficial.

In the embodiment described above, the determinant is supposed to be increased by gradually increasing θ. However, this is just an example and the determinant may also be increased by any other method. Since the determinant det is represented by |A| |B|sin θ, det increases as θ increases in the range in which 0≤θ≤90 degrees. That is why a new matrix may be obtained by changing det into a predetermined relatively large value det', obtaining θ' associated with det' by θ'=sin⁻¹(det'/(|A||B|)), and then rotating at least one of the vectors A and B so that the angle becomes equal to or greater than θ'. In this case, however, det is supposed to be changed so that the angle obtained based on the initial value det satisfies θ+90 degrees>θ'. As it can be seen what value the determinant needs to be changed into in order to reduce the influence of the errors sufficiently in an environment where the magnitude of the errors can be seen, θ' can be obtained by directly specifying det' even without performing the repetitive processing.

In the foregoing description, the matrix adjustment processing is supposed to be performed every time an image is shot. However, the matrix adjustment processing does not have to be performed every time shooting is done. For example, if the transmitting areas C1 and C2 of the light-transmitting plate 2 and the transmitting filters D1 and D2 of the image sensor 1 do not change, the transmittance measuring error does not change, either. That is why by using a matrix obtained with θ that has been estimated in advance by the method of this embodiment, multi-viewpoint images with little error can also be generated even for an image representing a different scene. Also, in shooting a moving picture, the transmitting areas C1 and C2 and the transmitting filters D1 and D2 do not change and scenes that change continuously need to be shot. That is why the processing of obtaining θ from one image frame of the moving picture may be performed and then multi-viewpoint images may be calculated by using θ that has already been obtained for the frames that follow. As a result, the computational load of the θ estimation processing while shooting a moving picture can be lightened.

Embodiment 2

Hereinafter, a second embodiment of the present invention will be described.

In the image capture device of the first embodiment described above, the light-transmitting plate 2 has two transmitting filters with mutually different spectral transmittance characteristics, so does each unit element of the image sensor 1. However, the present invention is in no way limited to that specific embodiment. The light-transmitting plate 2 and each unit element of the image sensor 1 may each have three or more transmitting filters or may have mutually different numbers of transmitting filters. Hereinafter, a generalized one of the configuration of the first embodiment, in which m (where m is an integer that is equal to or greater than two) transmitting filters are arranged in the light-transmitting plate 2 and in which n (where n is an integer that is equal to or greater than m) transmitting filters are provided for each unit element of the image sensor 1, will be described. The image capture device of this embodiment is quite the same as the first embodiment described above except the configurations of the light-transmitting plate 2 and the image sensor 1 and the processing performed by the image signal generating section 7. The following description of this second embodiment will be focused on those differences from the first embodiment and their common features will not be described all over again to avoid redundancies.

Figure 14:
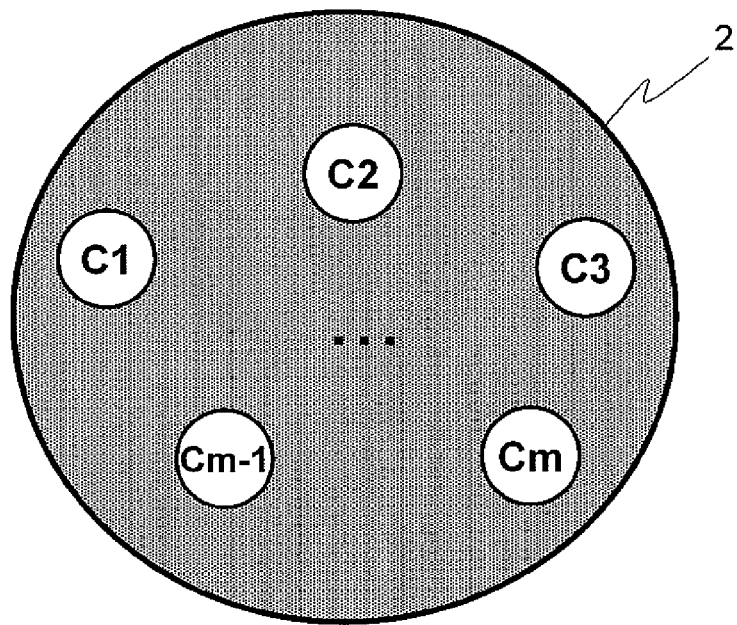
FIG. 14 A view illustrating an example of a light-transmitting plate with m transmitting areas.

FIG. 14 schematically illustrates an exemplary configuration for the light-transmitting plate 2 of this embodiment. The light-transmitting plate 2 of this embodiment has m transmitting areas C1, C2, . . . and Cm, in each of which a transmitting filter is arranged. The transmittances of these m transmitting areas C1 through Cm have mutually different wavelength dependences. The rest of the light-transmitting plate 2 other than the m transmitting filters is an opaque area that does not transmit light. In FIG. 14, all of those transmitting areas are drawn as circular ones with the same planar area. However, the shape and size of the respective transmitting areas do not have to be the illustrated ones. The arrangement of the respective transmitting areas does not have to the illustrated one, either, but any other arrangement may be adopted as well. Likewise, the light-transmitting plate 2 does not have to have a circular shape, either but may also be a quadrilateral or any other shape. Furthermore, although the light transmitting plate 2 has an opaque area according to this embodiment, the opaque area may also be made of a light-transmitting member and treated as a transmitting area, too.

Figure 15:
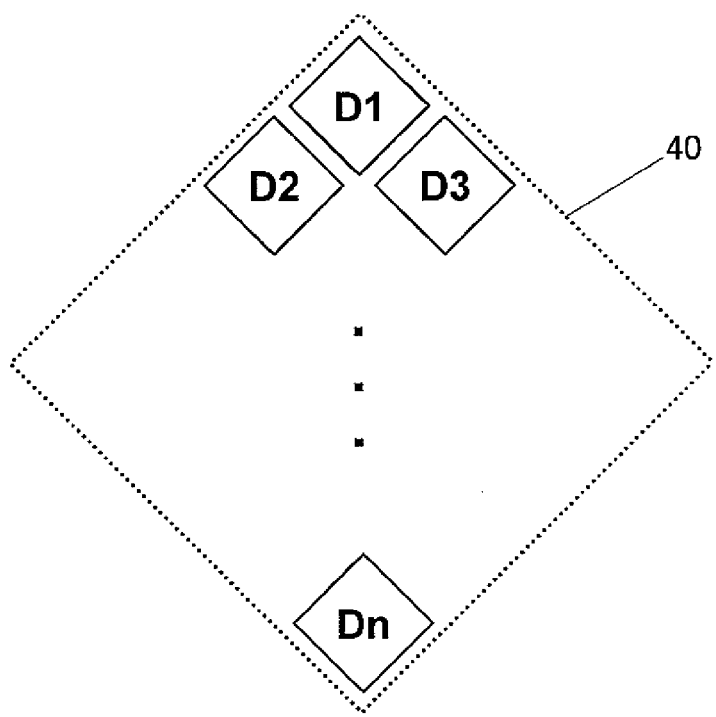
FIG. 15 A view illustrating an exemplary arrangement of n transmitting filters in each unit element of the image sensor.
Figure 16:
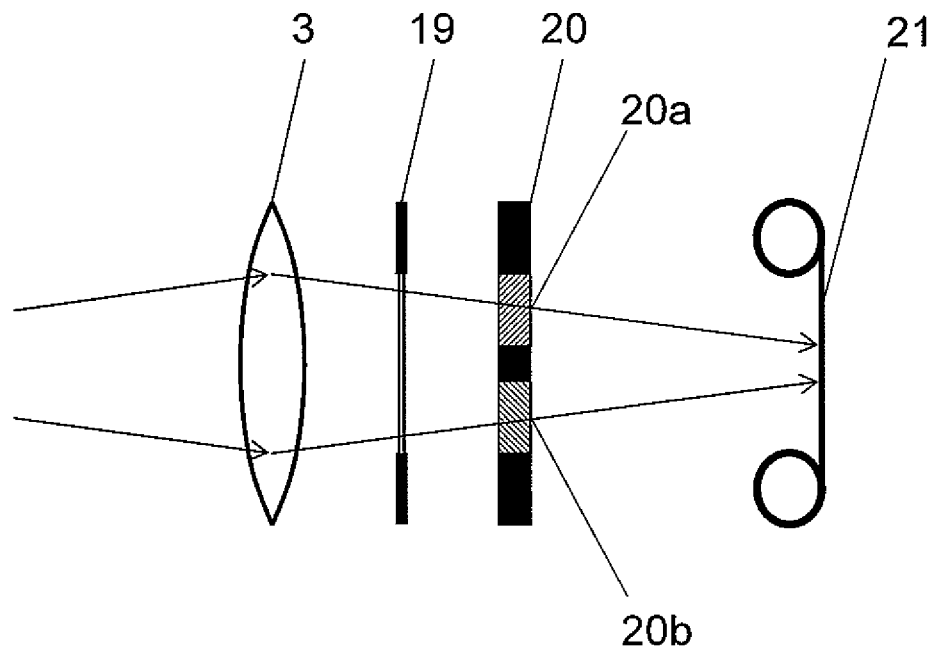
FIG. 16 A view illustrating the arrangement of an image capturing system according to Patent Document No. 1.
Figure 17:
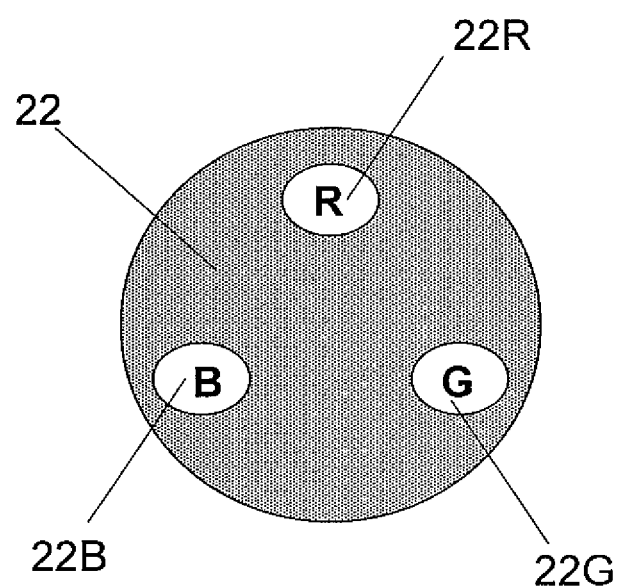
FIG. 17 A view illustrating the appearance of a light beam confining plate according to Patent Document No. 2.
Figure 18:
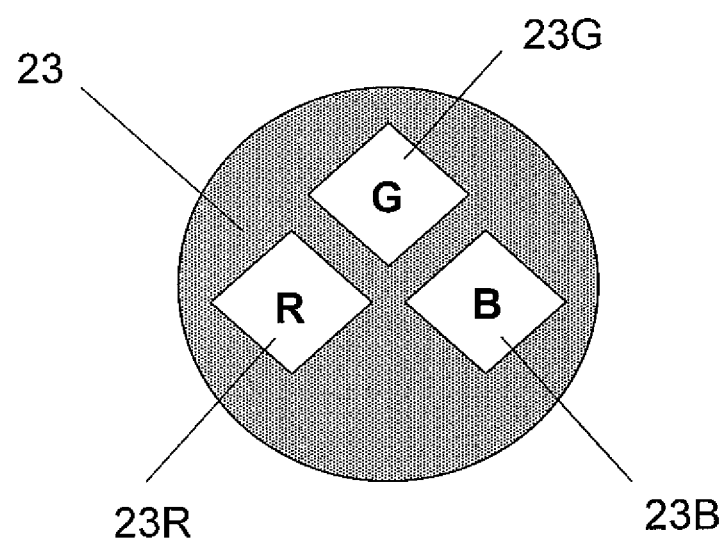
FIG. 18 A view illustrating the appearance of a light beam confining plate according to Patent Document No. 3.

FIG. 15 schematically illustrates an exemplary arrangement of n transmitting filters that are included in each unit element 40 of the image sensor 1 of this embodiment. Each unit element 40 of the image sensor 1 includes n photosensitive cells and n transmitting filters that face them. The transmittances of these n transmitting filters D1, D2, . . . and Dn have mutually different wavelength dependences. It should be noted that the arrangement shown in FIG. 15 is just an example and pixels may also be arranged in any other pattern within each unit element 40.

Suppose, in the configuration described above, the pixel signals output from the transmitting filters D1, D2, . . . and Dn of the image sensor 1 are identified by d1, d2, . . . and dn, respectively, and signals representing the intensities of light rays that are incident on the respective photosensitive cells from the transmitting areas C1, C2, . . . and Cm in a situation where the transmittances of the transmitting areas C1 through Cm and the transmitting filters D1 through Dn are supposed to be 100% are identified by Ci1, Ci2, . . . and Cim. In that case, the relation between the pixel signals d1, d2, . . . and dn and the image signals Ci1, Ci2, . . . and Cim is represented by the following Equation (18):

$$\begin{pmatrix} d1 \\ d2 \\ \vdots \\ dn \end{pmatrix} = \begin{pmatrix} Mx11 & Mx12 & \ldots & Mx1m \\ Mx21 & Mx22 & \ldots & Mx2m \\ \vdots & \vdots & \ddots & \vdots \\ Mxn1 & Mxn2 & \ldots & Mxnm \end{pmatrix} \begin{pmatrix} Ci1 \\ Ci2 \\ \vdots \\ Cim \end{pmatrix} \quad (18)$$

In the first embodiment described above, the 2×2 matrix is transformed into a matrix that is not affected by errors easily. In this embodiment, on the other hand, the n×m matrix represented by Equation (18) is transformed by a similar method into a matrix that is not affected by errors easily. In the first embodiment, a method of making the angle between the two vectors closer to 90 degrees (i.e., a method of increasing the angle between the two vectors) is adopted in order to increase |det|. If this method is extended to the n×m matrix, the best matrix may be estimated by using m vectors consisting of the elements of each column of the matrix. Specifically, the angles between the vectors are obtained from among $_mC_2$ combinations, each of which is defined by choosing two out of m vectors. Since a combination in which the angle between the vectors is the smallest is a combination of vectors that will make calculation of multi-viewpoint images least stabilized, a matrix is newly obtained by increasing the angle between those vectors by the same method as what is adopted in the first embodiment described above. That is to say, with the angle between the vectors increased step by step, the degree of confidence and the correlation value are obtained and the degree of likelihood of the multi-viewpoint images generated is determined. As a result, even if the number of vectors is m, the best matrix can be obtained on a step by step basis and multi-viewpoint images can also be generated.

Next, suppose what if only two arbitrary ones of the m multi-viewpoint images should have their errors reduced during generation. In that case, by choosing two vectors from the matrix and increasing the angle θ between the vectors, only two arbitrary ones of the m multi-viewpoint images can have their errors reduced. This method is also applicable to a situation where only k arbitrary ones (where k is an integer that is equal to or greater than three) of the m multi-viewpoint images should have their errors reduced. As a result, among multiple images generated by imaging the light that has come through the light transmitting section with multiple transmitting areas, only images associated with selected transmitting areas can have its image quality improved.

The image processing section 7 of this embodiment generates m multi-viewpoint images associated with m transmitting areas by performing the processing described above. However, the image processing section 7 may also generate images associated with only some of the m transmitting areas. For example, if only horizontal parallax information needs to be obtained, the image processing section 7 may be configured to generate images based on the light beams that have been incident on only two transmitting areas that are horizontally spaced apart from each other among those m transmitting areas.

The image capture device of the first and second embodiments described above generates an image signal by performing signal arithmetic operations on a photoelectrically converted signal that has been obtained by capturing an image. However, such processing of generating an image signal by performing signal arithmetic operations may also be carried out by another device that is provided independently of that image capture device. For example, even if a signal that has been obtained by an image capture device including the image capturing section 100 of this embodiment is loaded into another device (image processor) to get a program defining the signal arithmetic processing described above executed by a computer in that another device, the effects of the embodiments described above can also be achieved.

INDUSTRIAL APPLICABILITY

A 3D image capture device according to an embodiment of the present invention can be used effectively in any camera that ever uses an image sensor. Examples of those cameras include consumer electronic cameras such as digital still cameras and digital camcorders and solid-state surveillance cameras for industrial use.

REFERENCE SIGNS LIST 1 solid-state image sensor
1a imaging area of solid-state image sensor
2 light-transmitting plate
3 optical lens
3a optical element functioning as both light-transmitting plate and optical lens
4 infrared cut filter
5 signal generating and receiving section
6 sensor driving section
7 image signal generating section
8 interface section
19 lens diaphragm
20, 22, 23 light beam confining plate
20a color filter transmitting red-based light ray
20b color filter transmitting blue-based light ray
21 photosensitive film
22R, 23R R ray transmitting areas of light beam confining plate
22G, 23G G ray transmitting areas of light beam confining plate
22B, 23B B ray transmitting areas of light beam confining plate
30 memory
40 unit element
100 image capturing section
110 transmitting filter
120 photosensitive cell 200 signal processing section

The invention claimed is:

1. A 3D image capture device comprising:
    a light transmitting section with m transmitting areas (where m is an integer that is equal to or greater than two) that have mutually different spectral transmittance characteristics;
    an image sensor which is arranged to receive light rays that have been transmitted through the m transmitting areas and in which a plurality of unit elements are arranged, each said unit element including n photosensitive cells (where n is an integer that is equal to or greater than m) and n transmitting filters with mutually different spectral transmittance characteristics which are arranged so as to face the n photosensitive cells;
    an imaging section which produces an image on the imaging area of the image sensor; and
    an image processing section which modifies an n×m matrix that is defined by the respective spectral transmittance characteristics of the m transmitting areas and the n transmitting filters by changing the angle between at least two out of m column vectors of the n×m matrix and which generates multi-viewpoint images represented by light rays that have been incident on at least two of the m transmitting areas based on the modified n×m matrix and n photoelectrically converted signals supplied from the n photosensitive cells.

2. The 3D image capture device of claim 1, wherein the image processing section increases the determinant of the n×m matrix by increasing the angle between at least two of the m column vectors.

3. The 3D image capture device of claim 1, wherein the image processing section changes the angle so that a value representing correlation between the multi-viewpoint images becomes smaller than a predetermined threshold value.

4. The 3D image capture device of claim 1, wherein the image processing section increases the angle so that the determinant of the n×m matrix becomes greater than a predetermined threshold value.

5. The 3D image capture device of claim 1, wherein the image processing section increases the angle between two column vectors that is smaller than the angle formed by any other pair of the m column vectors.

6. The 3D image capture device of claim 1, wherein the image processing section obtains the angle between two arbitrary ones of the m column vectors and increases the angles sequentially by beginning with the smallest one, thereby increasing the determinant of the n×m matrix.

7. The 3D image capture device of claim 1, wherein m=2 and n=2.

8. An image processor which generates multi-viewpoint images based on a signal that has been obtained by a 3D image capture device, the device comprising:
    a light transmitting section with m transmitting areas (where m is an integer that is equal to or greater than two) that have mutually different spectral transmittance characteristics;
    an image sensor which is arranged to receive light rays that have been transmitted through the m transmitting areas and in which a plurality of unit elements are arranged, each said unit element including n photosensitive cells (where n is an integer that is equal to or greater than m) and n transmitting filters with mutually different spectral transmittance characteristics which are arranged so as to face the n photosensitive cells; and
    an imaging section which produces an image on the imaging area of the image sensor,
    wherein the image processor modifies an n×m matrix that is defined by the respective spectral transmittance characteristics of the m transmitting areas and the n transmitting filters by changing the angle between at least two out of m column vectors of the n×m matrix and generates multi-viewpoint images represented by light rays that have been incident on at least two of the m transmitting areas based on the modified n×m matrix and n photoelectrically converted signals supplied from the n photosensitive cells.

9. An image processing method for generating multi-viewpoint images based on a signal that has been obtained by a 3D image capture device, the device comprising:
    a light transmitting section with m transmitting areas (where m is an integer that is equal to or greater than two) that have mutually different spectral transmittance characteristics;
    an image sensor which is arranged to receive light rays that have been transmitted through the m transmitting areas and in which a plurality of unit elements are arranged, each said unit element including n photosensitive cells (where n is an integer that is equal to or greater than m) and n transmitting filters with mutually different spectral transmittance characteristics which are arranged so as to face the n photosensitive cells; and
    an imaging section which produces an image on the imaging area of the image sensor,
    wherein the image processing method comprises the steps of:
    modifying an n×m matrix that is defined by the respective spectral transmittance characteristics of the m transmitting areas and the n transmitting filters by changing the angle between at least two out of m column vectors of the n×m matrix; and
    generating multi-viewpoint images represented by light rays that have been incident on at least two of the m transmitting areas based on the modified n×m matrix and n photoelectrically converted signals supplied from the n photosensitive cells.

10. An image processing program stored on a non-transitory computer readable medium for generating multi-viewpoint images based on a signal that has been obtained by a 3D image capture device, the device comprising:
    a light transmitting section with m transmitting areas (where m is an integer that is equal to or greater than two) that have mutually different spectral transmittance characteristics;
    an image sensor which is arranged to receive light rays that have been transmitted through the m transmitting areas and in which a plurality of unit elements are arranged, each said unit element including n photosensitive cells (where n is an integer that is equal to or greater than m) and n transmitting filters with mutually different spectral transmittance characteristics which are arranged so as to face the n photosensitive cells; and
    an imaging section which produces an image on the imaging area of the image sensor,
    wherein the program is defined so as to make a computer perform the steps of:
    modifying an n×m matrix that is defined by the respective spectral transmittance characteristics of the m transmitting areas and the n transmitting filters by changing the angle between at least two out of m column vectors of the n×m matrix; and
    generating multi-viewpoint images represented by light rays that have been incident on at least two of the m transmitting areas based on the modified n×m matrix and n photoelectrically converted signals supplied from the n photosensitive cells.

* * * * *